April 30, 1968  R. R. VAN DEVENDER, JR  3,380,761
QUICK DISCONNECT COUPLING DEVICE
Filed July 27, 1965  2 Sheets-Sheet 1

INVENTOR.
RUSSELL R. VAN DEVENDER JR.
BY
ATTORNEY

April 30, 1968  R. R. VAN DEVENDER, JR  3,380,761
QUICK DISCONNECT COUPLING DEVICE Filed July 27, 1965  2 Sheets-Sheet 2

INVENTOR.
RUSSELL R. VANDEVENDER JR.
BY
ATTORNEY

United States Patent Office 3,380,761
Patented Apr. 30, 1968

3,380,761
QUICK DISCONNECT COUPLING DEVICE
Russell R. Van Devender, Jr., China Lake, Calif., assignor to United States of America as represented by the United States Atomic Energy Commission
Filed July 27, 1965, Ser. No. 475,298
4 Claims. (Cl. 285—34)

ABSTRACT OF THE DISCLOSURE

Apparatus for rapidly separating two tubular sections joined by using segments of a screw thread within one section engaging a mating threaded end within the second section. On command the segments are forced inwardly by camming motion thereby separating the first section from the second.

---

Figure 1:
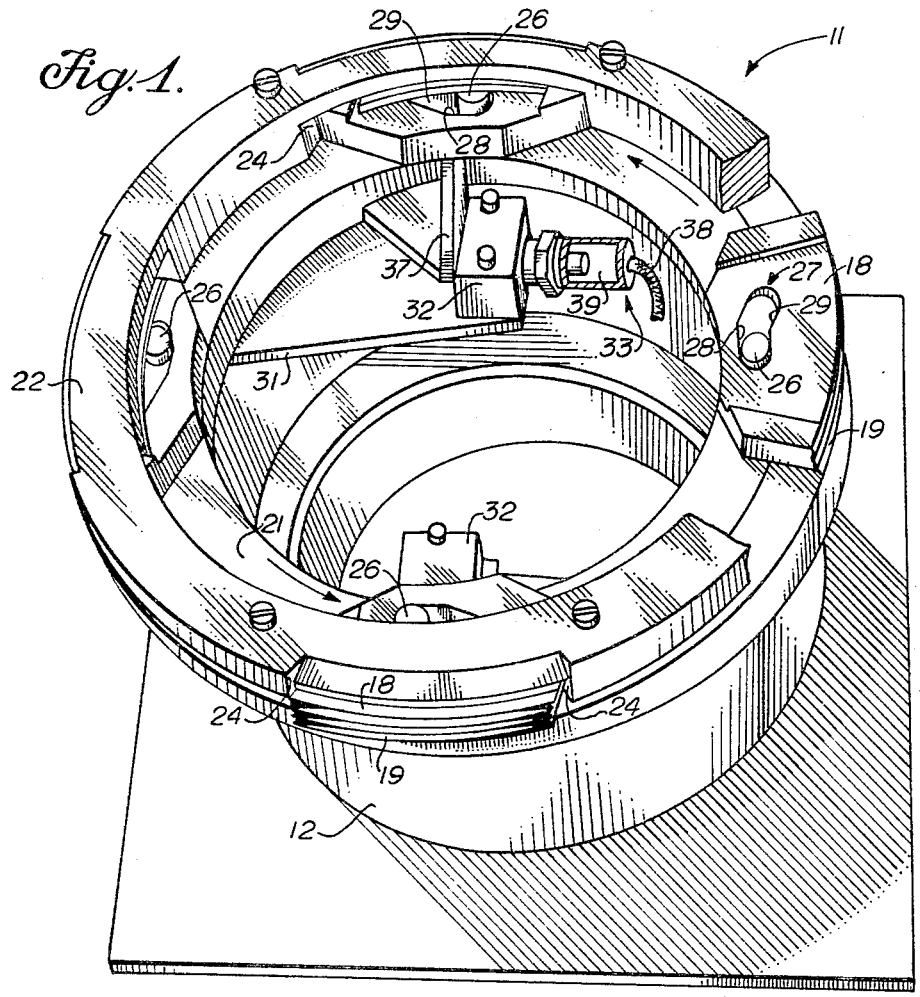

The present invention relates to quick disconnect coupling mechanisms. More particularly it relates to mechanical separation devices especially adapted for missile in-flight stage disconnection.

Space mission operations presently require the use of several rocket motor and other stages arranged for the separation of the various rocket motor stages or separation of a rocket motor from the payload. In order to avert abortion of flight objectives, these separation operations must provide complete severance with a high degree of reliability. It is desirable that the separation event consume only minimal energy and introduce no unpredictable acceleration forces which can throw the missile off course or disturb the orientation thereof. Further, the joint should provide rigid coupling between stages prior to the separation operation.

Explosive Primacord shear arrangements have often served as separation devices. This scheme has the disadvantage that it does not lend itself to preflight checkout operations and hence provides only that assurance gathered from statistical reliability data. This Primacord arrangement has the further disadvantage of producing flying shrapnel which on occasion penetrates the payload section and damages the instruments contained therein. Also such separation devices could be dangerous to launch personnel in the event of an inadvertent firing. Frangible explosive bolt-clamp combinations in the past have also found extensive use as missile stage separation devices. These arrangements have some of the disadvantages as the above-mentioned Primacord devices and further are undesirable in that complete severance often is not uniformly achieved, such as when portions of the clamp arrangement fail to completely and smoothly release the joined missile sections. Mechanical schemes for staging separation often are complex with attendant low reliability. Their structural characteristics frequently involve external protrusions causing expensive aerodynamic drag. Also these mechanical arrangements often require substantial driving power and associated weighty equipment at the expense of payload capacity.

The present invention overcomes prior difficulties of this missile separation problem by employing an arrangement in which a group of retractile grooved segments circumferentially is disposed about the end of one missile stage. The grooves of all segments are arranged, for example, to compositely form a threaded end portion on the missile stage, each segment being retractile in a direction away from the thread surface. The missile section to be joined to this stage supporting the grooved segments is provided with mating threads which upon engaging the grooved segments rigidly join the two missile sections. A driver ring, rotatable axially, is mounted in the first missile section adjacent the retractile segments and is provided with protruding members extending into slots formed in the retractile segments. The slots are arranged at an angle, relative to the motion of the protrusions such that rotary motion of the ring will drive all of the threaded segments simultaneously and uniformly away from the mating surface of the other missile section thereby smoothly and reliably releasing the two missile sections from each other. The nature of the driver ring is such that it is especially adapted to be driven by a light-weight gas driven plunger mechanism.

The basic concept of the present invention, described above, is significantly uncomplicated and possessed of the reliability concomitant to simplicity. It is rugged. Further, its nature is such that it can be repeatedly tested during preflight checkout operations, thus providing that desired high degree of assurance of flight success. The use of a gas generator power source holds weight requirements at a minimum thus permitting larger payloads. Furthermore, this separation joint can be mounted entirely internally, thus presenting no aerodynamic drag problems. The configuration is especially suitable for joining tandem cylindrical bodies or components or in any other arrangement in which mating joints can be used.

It is unnecessary to discuss at any length the role played by devices such as the present invention in modern missile technology. It is well known that unsuccessful inflight separations account for a substantial number of mission failures. Hence, a device which substantially improves assurance of flight success by precluding mission abortion at time of separation is a valuable device.

Accordingly, it is an object of the present invention to provide a coupling device adapted for reliable and complete separation of the components joined thereby;

Another object of the present invention is to provide a missile stage coupling and separation device which lends itself to repeated testing and operation;

Still another object of the present invention is to provide a separation device capable of securing staged components in rigid tandem engagement;

A further object of this invention is to provide a missile stage separation device requiring a low actuation power;

A still further object of this invention is to provide balanced uniform rapid separation between two cylindrical axially-mounted parts.

Yet another object of this invention is to provide a missile stage separation mechanism actuable by a gas generator device with no attendant flying shrapnel problems.

Figure 2:
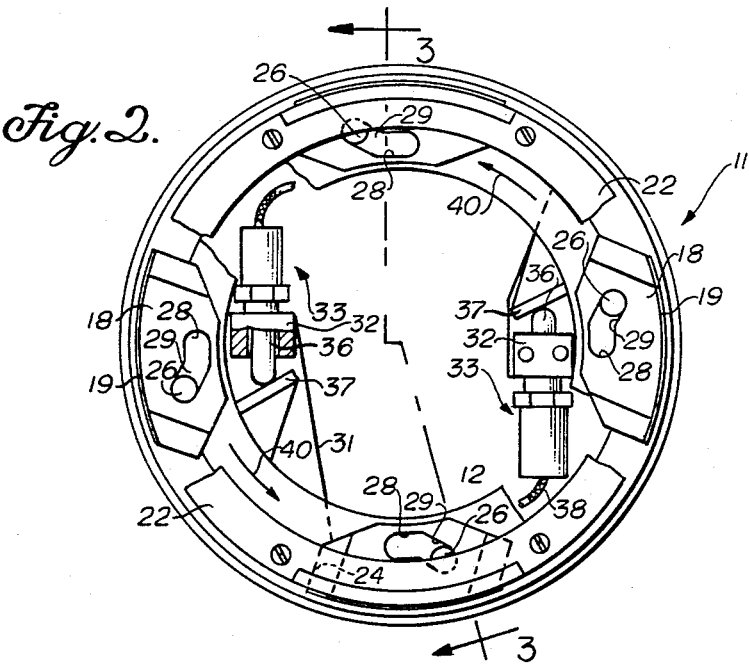
Figure 3:
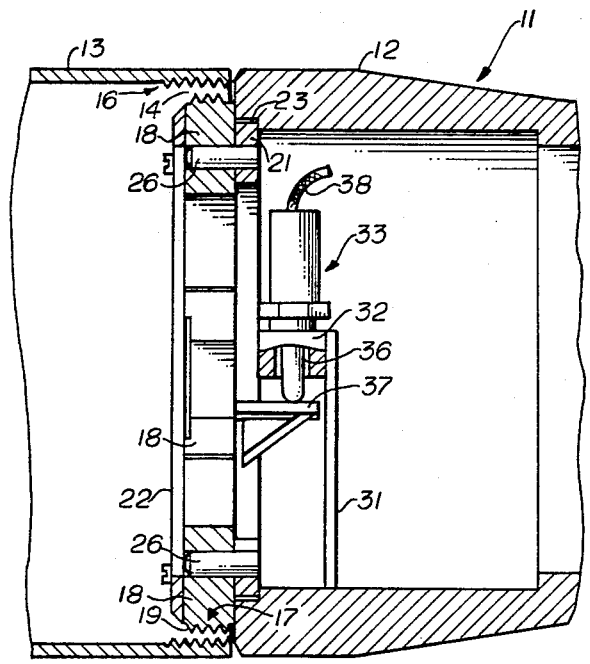

The manner of achieving these and other objects of the present invention will be more apparent to those skilled in the art from the following detailed description of a preferred embodiment of the invention taken in conjunction with the accompanying drawings in which:

FIGURE 1 isometrically portrays one embodiment of the rapid disconnect coupling device of the present invention;

FIGURE 2 is an end view of the device of FIGURE 1 taken at the joint interface showing the retractile threaded segments retracted; and FIGURE 3 is a cutaway cross sectional view of the device taken at lines 3—3 of FIGURE 2.

Referring now to the drawings, there is shown a coupling joint 11 adapted to couple a first annular missile joint section 12 to a second annular missile section 13 (see FIGURE 3) until release at selected time-in-flight is desired. It will be appreciated that the annular joint sections may be continuations of the missile housing or other tube-like devices to be joined or to be an illustrative portion of modified embodiments employing separate joints to join bodies of diverse types and applications. As portrayed in FIGURE 3, these two missile sections 12 and 13 are rigidly joined in axial tandem alignment at threaded interface 14 which is defined by internal threads 16, formed in a projecting ring or shell portion provided on an end of section 13, and retractile segmented means including external thread means 17 provided on mating end of section 12. The missile sections 12 and 13 may be abutting rocket motor stages or a rocket motor stage and a payload stage, respectively, or vice versa. As detailed in FIGURES 1 and 2, the retractile segmented means of section 12 is provided as a suitable multiplicity of plate segments 18 disposed for retraction radially inward at a uniform radius about the axis of the mating end. The radially outward arcuate end of each of segments 18 is provided with a set of grooves 19 which are fabricated and arranged to form thread means 17. The grooves may most conveniently be formed as segments of a standard helical weight bearing thread or may be of modified design described hereinafter. A driver ring 21 is coaxially circumferentially-slidably mounted inside the mating shell end of section 12 immediately adjacent the axially innermost side of segments 18. Retainer ring 22 is attached to section 12, for example by bolts or by welding, and retains driver ring 21 and segments 18 in their appropriate sliding positions. Driver ring 21 is free to rotate in circumferential guideway 23 formed in the inner periphery of the end shell portion of missile section 12. Segments 18 are provided with parallel sides oriented chordwise and free to slide in guideway slots 24 formed in retainer ring 22. For actuating the segments in the aforesaid radial direction driver ring 21 is provided with a series of protruding pins 26, one pin for each retractile segment 18, the pins being positioned to be slidably received by angled groove 27 defined by segments 18. These pins may be considered to be cam followers. These slots which may be considered to have cam surfaces are fashioned to have a first inner section 28 oriented generally parallel or arcuately coaxial to the direction of free circumferential motion of driver ring 21 and a second section 29 obtusely angled outwardly away from the general direction of the first section 28 of groove 27. The first section 28 provides a locking position for securely retaining segments 18 in place while the missile sections are to be joined.

Motivating power for rotating driver ring 21 may be supplied by means including a plate 31 rigidly affixed to an end wall or mounting ring of missile section 12 and supporting mounting block 32 which in turn supports on one circumferential side a gas driven piston or plunger mechanism 33. Mounting block 32 is provided with a cut-out center section 34 traversed in a circumferential direction by plunger rod 36 of plunger mechanism 33 so that the tip of plunger 36 rests against bracket 37 which is rigidly attached to project radially inward from driver ring 21. The mechanism 33 may be a conventional explosive piston or plunger device such as a Model 2900 Linear Actuator manufactured by Holex Corporation. Briefly such a device includes a pyrotechnic or explosive composition disposed in a piston which is provided with an electrical initiator. A piston connected to a flask high pressure gas supply through a solenoid or explosively actuated valve might also be employed.

Note that although two plunger mechanisms are shown only one is required for operation. The use of one redundant unit merely serves to increase system reliability. Electrical cable 38 carries electrical power required to initiate an expanding gas reaction in chamber 39 of plunger mechanism 33.

When it is desired to assemble missile sections 12 and 13, prior to flight driver ring 21 is rotated clockwise, as shown in FIGURES 1 and 2, until bracket 37 rests against block 32. With the driver ring in this position, pins 26 reside in the first sections 28 of groove 27 and hold retractile segments in their outermost position where they compositely provide thread means 17. Section 13 is then "screwed" onto section 12 whereby the two sections are rigidly joined. It is to be noted that the driver ring 21 and pins 26 may be replaced by other equivalent cam means to impart rectilinear motion to segments 18. For example, separate eccentrically mounted cams may be positioned to ride on the surface of segments 18 distal the surface defining grooves 19. Such a cam would be coupled to the gas driven plunger mechanism 33 by suitable means for converting linear motion to rotary motion. The segments 18 would be adapted to be extended when the apogean segment of the eccentrically mounted cam is residing thereon and retracted when the perigean segment of the cam is residing thereon.

The quick disconnect operation of this separation joint device now will be described. Upon command, as provided by conventional circuitry not disclosed herein, an electrical signal transmitted along electrical cable 38 initiates the above-mentioned expanding gas reaction in chamber 39. The force of the expanding gas drives plunger 36 against bracket 37 so as to impart a counterclockwise (as depicted in FIGURE 1 by arrows 40) linear force to rotate ring 21. In this manner, a significant portion of the energy derived from the expanding gas is transmitted to driver ring 21. As ring 21 rotates, it carries pins 26 along the first section 28 of groove 27 to the region where this section 28 merges into section 29 of groove 27. As previously described, section 28 of groove 27 is generally aligned with the direction of free rotational motion of driver ring 21 such that the motion of pins 26 along section 28 imparts no motion to retractile segments 18. Now when pins 26 reach sections 29 of grooves 27, which angle outwardly away from sections 28, these pins 26 will strike the inward side of groove 27 thus driving retractile segments 18 towards the principal axis of section 12 and away from threaded interface 14. When these segments 18 are thus retracted inwardly, the threaded connection between sections 12 and 13 is disengaged and sections 12 and 13 are thus uncoupled from each other as illustrated in FIGURE 3. These two sections 12 and 13 then can be pushed apart easily such as by use of a conventional spring mechanism (not shown).

At this point, it should be noted that ring 21 will rotate a discrete distance from its point of initial rest up to the point where pins 26, which are rigidly connected to ring 21, reach the juncture of section 28 with section 29. It is during this discrete rotational distance that driver ring 21 gains the kinetic energy from plunger mechanism 33 that is required to drive segments 18 inwardly and thereby effect the separation event. Without the use of this energy-gaining distance, a larger plunger mechanism, or other prime mover means, would be required to retract the several slotted segments 18. Moreover, the impact of the accelerated ring is more effective to effect loosening of the contact surfaces.

Note that the directions of travel of segments 18 in slots 24 are canted away from the axis of section 12. This direction of travel substantially coincides with the direction of the force on segments 18 caused by the impact between pin 26 and the inner surface of section 29 of groove 27. This force direction is determined by the direction of travel of pin 26 and the angle of incidence of pin 26 with the inner surface of section 29 of groove 27. By determining the direction of travel of the retractile segments 18 within slots 24 to be substantially coincident with the direction of the above-mentioned resultant force, there will be only a minimal frictional interference between the retractile segments 18 and the sides of slots 24.

It should be emphasized that the separation joint of the present invention has a field of utility broader than just a use as a missile separation device, although especially valuable as such. This joint can be used for any positive-action disconnect operation, for example, to release oil well casing at inaccessible locations.

An interesting variation of this invention entails the joinder of casing, particularly in those cases involving the joinder of non-cylindrically-shaped-sections. In such a case, the two sections to be joined would be locked together by a reverse operation of the above-mentioned driver ring, rather than by "screwing" one threaded section onto a thread means formed by a group of slotted retractile segments. In such an embodiment, it would not be necessary for the retractile segments to define compositely formed thread means. Such a joinder could be accomplished, for example, by adapting the retractile segments and casing to be joined with complementary grooves. With non-rotatable sections the retractile elements could be in "open" position allowing the section to be abutted into position and the driver ring and segments moved manually for locking.

These and various other changes may be made in the shape and arrangements of the several parts without departing from the broad scope of the invention, as defined in the following claims.

What is claimed is:
1. In a coupling adapted for rapid separation of a first tubular section from a second tubular section having continuous internal threads proximate one end thereof, the combination comprising:
   (a) an annular joint member mounted at one end of said first tubular section, said joint member having several slots extending radially through said member at spaced intervals about the periphery thereof;
   (b) a radially slidable segment mounted in each of said slots of said annular joint member, said segments having screw threads on the surfaces thereof which project through the slots of said annular joint member, and which engage said internal threads of said second tubular member, said segments also having a slot axially therethrough defining a cam race;
   (c) a driver ring coaxially and rotatably mounted in said annular joint member and supporting said segments on one axial face thereof,
   (d) a cam follower mounted on said driver ring, engaging the cam race of said radially slideable segments and operable to slide said segments radially as said driver ring is driven circumferentially; and
   (e) means for circumferentially rotating said driver ring located radially inwardly of said first and second tubular members, and including (1) drive means for rotating said ring rigidly secured to one of said tubular sections, and (2) power transfer means for connecting said drive means to said driver ring; whereby energizing said dive means rotates said ring, engages said cam follower with said cam, slides said segments radially inward, and releases said tubular sections.

2. The apparatus of claim 1, further defined wherein said joint members are uniformly spaced about the periphery of said first tubular section.

3. The apparatus of claim 1, further defined wherein said power transfer means includes a bracket mounted to the driver ring adjacent to said drive means for receiving the energy from said drive means.

4. The apparatus of claim 1, further defined wherein said drive means is a gas-driven piston.

References Cited
UNITED STATES PATENTS

| | | | |
|---|---|---|---|
| 1,920,524 | 8/1933 | Reed | 285—34 |
| 2,001,244 | 5/1935 | Ezell | 285—34 |
| 3,110,260 | 11/1963 | Slomka. | |
| 3,174,706 | 3/1965 | Wagner. | |

EDWARD C. ALLEN, *Primary Examiner.*

CARL W. TOMLIN, *Examiner.*

R. G. BERKLEY, *Assistant Examiner.*